US011887487B2

(12) United States Patent
Schwindt

(10) Patent No.: US 11,887,487 B2
(45) Date of Patent: Jan. 30, 2024

(54) METHOD AND SYSTEM FOR THE UPDATING OF A FLIGHT PLAN

(71) Applicant: GE Aviation Systems Limited, Cheltenham (GB)

(72) Inventor: Stefan Alexander Schwindt, Cheltenham (GB)

( * ) Notice: Subject to any disclaimer, the term of this patent is extended or adjusted under 35 U.S.C. 154(b) by 324 days.

(21) Appl. No.: 16/925,480

(22) Filed: Jul. 10, 2020

(65) Prior Publication Data

US 2022/0013018 A1 Jan. 13, 2022

(51) Int. Cl.
*G08G 5/00* (2006.01)

(52) U.S. Cl.
CPC ......... *G08G 5/0039* (2013.01); *G08G 5/0013* (2013.01); *G08G 5/0021* (2013.01); *G08G 5/0091* (2013.01)

(58) Field of Classification Search
CPC .. G08G 5/0039; G08G 5/0013; G08G 5/0017; G08G 5/0034; G08G 5/0021; G08G 5/0047; G08G 5/0052; G08G 5/0078; G08G 5/0086; G08G 5/0091; G08G 5/003
See application file for complete search history.

(56) References Cited

U.S. PATENT DOCUMENTS 7,904,213 B2 3/2011 Coulmeau
8,112,186 B2 2/2012 Sylvester
8,849,476 B2 9/2014 Coulmeau
8,918,280 B1 12/2014 Heinrich
9,824,593 B1 11/2017 Kronfeld et al.
9,847,031 B2 12/2017 Agarwal et al.
9,886,861 B2 2/2018 Shamasundar et al.
9,922,568 B2 3/2018 Raynaud et al.
9,965,961 B2 5/2018 Agrawal
10,026,324 B2 * 7/2018 Shamasundar .......... G08G 5/04
10,290,217 B1 5/2019 Ramachandra et al.
2016/0019795 A1 1/2016 Chircop et al.
2017/0343357 A1 * 11/2017 Mere .................. G06F 11/1658
2018/0366008 A1 * 12/2018 Dacre-Wright ...... G08G 5/0021
2019/0213891 A1 * 7/2019 Snyder ................. G08G 5/0013
2019/0304314 A1 10/2019 Hochwarth et al.
2020/0273356 A1 * 8/2020 Raynaud .............. G08G 5/0078

FOREIGN PATENT DOCUMENTS

CN 104615849 A 5/2015
CN 107065900 A 8/2017
CN 107544529 A 1/2018
CN 107818396 A 3/2018
EP 3511923 A1 7/2019

* cited by examiner

*Primary Examiner* — Shon G Foley
(74) *Attorney, Agent, or Firm* — McGarry Bair PC

(57) ABSTRACT

A method for updating a flight plan comprising, via an avionics device, at least a portion of a flight plan from an external source, authenticating or validating the update, generating a set of updated flight parameters, comparing the set of updated flight parameters with a current set of flight parameters, receiving a set of environmental conditions, performing a series of plausibility checks and automatically updating at least a portion of the flight plan or generating an indication.

20 Claims, 4 Drawing Sheets

METHOD AND SYSTEM FOR THE UPDATING OF A FLIGHT PLAN

TECHNICAL FIELD

This disclosure relates generally to automatically updating a flight plan.

BACKGROUND

In an effort for airspace modernization, air traffic management is being modernized to leverage emerging technologies and aircraft navigation capabilities. Aircraft can exploit high accuracy provided by Global Navigation Satellite System (GNSS) and Global Positioning System (GPS)-based navigation systems, modern Flight Management Systems (FMSs) and Flight Control Systems (FCSs). Aircraft can run or be operated according to a flight plan loaded on or through the FMS. In some cases, a portion of the flight plan can require an update due to environmental or operational conditions such as traffic, weather, fuel usage, or the like. Currently, updates to the flight plan require a manual update by a flight crew or a pilot in order to operate the aircraft according to an updated flight plan.

BRIEF DESCRIPTION

An aspect of the present disclosure relates to a method for updating a flight plan, comprising receiving, via an avionics device, an update to at least a portion of a flight plan from an external source, at least one of authenticating or validating, via the avionics device, the update to define a valid update, generating with the valid update, via the avionics device, a set of updated flight parameters comprising, at least one of a fuel usage or a flight time, comparing, via the avionics device, the set of updated flight parameters with a set of current flight parameters to determine a difference in at least one of fuel usage or flight time, receiving, via the avionics device, a set of environmental conditions comprising, at least one of a weather pattern or an air-traffic pattern to define a set of received environmental conditions, performing, via the avionics device, a series of plausibility checks based of the comparing, and in response to the series of plausibility checks, automatically updating the at least the portion of the flight plan if plausible or generating an implausible indication if there is an implausible condition.

In another aspect, the disclosure relates to a system adapted to verify an updated flight plan, to perform the steps of receiving the updated flight plan, generating a set of updated flight parameters comprising, at least one of a fuel usage or a flight time, comparing the set of updated flight parameters with a set of current flight parameters to determine a difference in at least one of fuel usage or flight time, generating a set of environmental conditions comprising, at least one of a weather pattern or an air-traffic pattern to define a set of received environmental conditions, performing a series of plausibility checks based of the comparing, and in response to the series of plausibility checks, automatically updating at least a portion of the flight plan if plausible or generating an indication if there is an implausible condition.

BRIEF DESCRIPTION OF THE DRAWINGS

A full and enabling disclosure of the present description, including the best mode thereof, directed to one of ordinary skill in the art, is set forth in the specification, which refers to the appended FIGS., in which.

DETAILED DESCRIPTION

Figure 1:
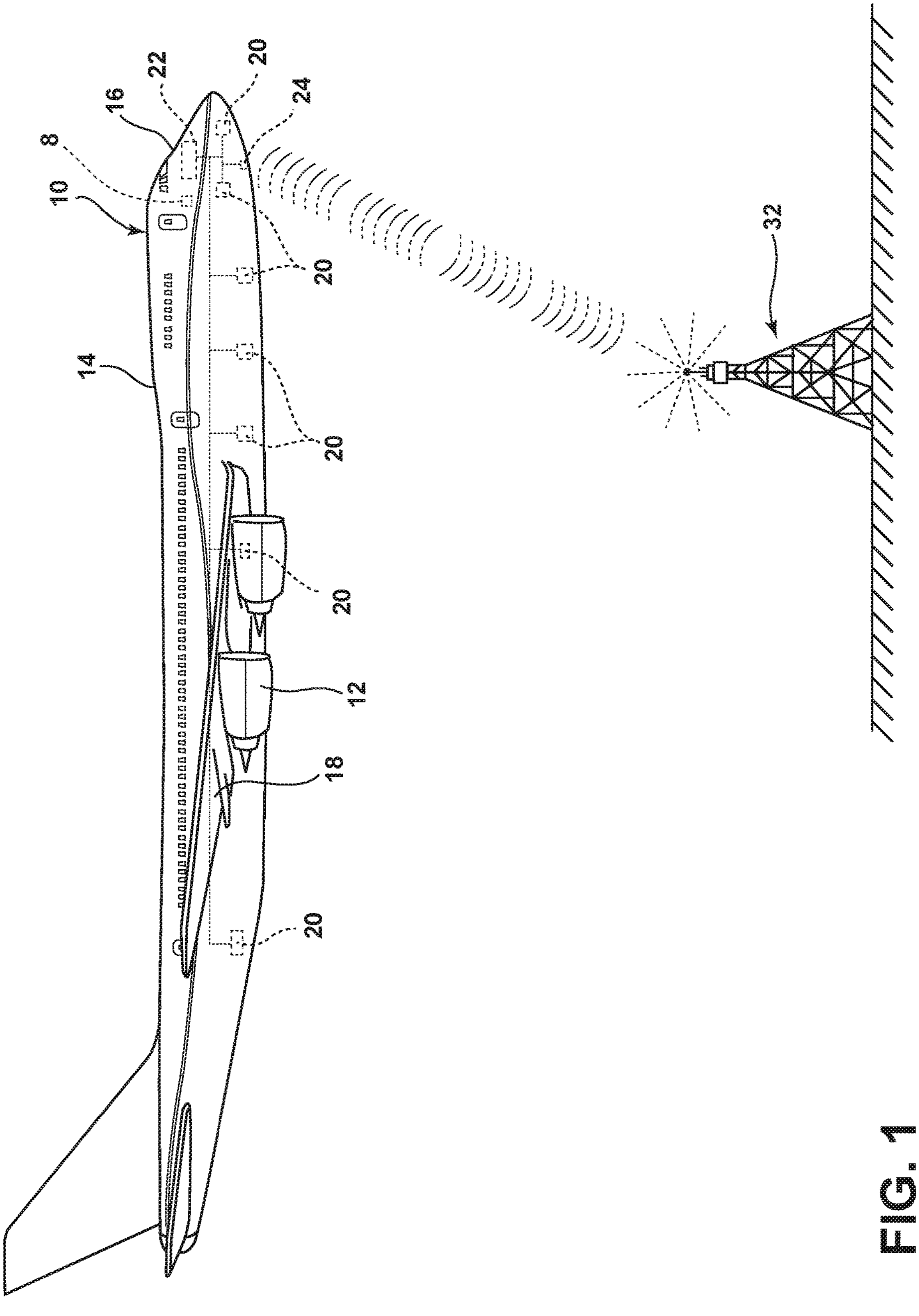
FIG. 1 is a schematic illustration of an aircraft and ground system according to aspects described herein.

Aspects of the present disclosure relate to providing a method and system for automatically updating at least a portion of a flight plan through an avionics device. The avionics device can be defined to be one or more of a Flight Management System (FMS), or the like. The avionics device can receive an update to at least a portion the flight plan from an external source such as, but not limited to an Air Traffic Controll (ATC), an Electronic Flight Bag (EFB), an Aircraft Communications Addressing and Reporting System (ACARS), or an Airline Operations Center (AOC). The avionics device can subsequently perform or solicit the execution of authentications and plausibility checks of the update to at least a portion of the flight plan. In the event that the update to the flight plan is plausible, the avionics device can automatically update the current flight plan with the updates received from the external source and operate the aircraft according to the updated flight plan.

The update to at least a portion of the flight plan can be authenticated and validated, via the avionics device, to define a valid update which can subsequently be executed via the avionics device with minimal intervention required from one of either a flight crew or a pilot. This can allow for an increased efficiency of the flight crew or the pilot of the aircraft as they are no longer required to manually update the flight plan if an update is received. Instead, the flight plan can be updated automatically through the avionics device.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection or communicative connection between respective elements. Furthermore, as used herein, the term "set" or a "set" of elements can be any number of elements.

As used herein, a "controller" or "controller module" can include a component configured or adapted to provide instruction, control, operation, or any form of communication for operable components to affect the operation thereof. A controller module can include any known processor, microcontroller, or logic device, including, but not limited to: Field Programmable Gate Arrays (FPGA), a Complex Programmable Logic Device (CPLD), an Application-Specific Integrated Circuit (ASIC), a Full Authority Digital Engine Control (FADEC), a Proportional Controller (P), a Proportional Integral Controller (PI), a Proportional Derivative Controller (PD), a Proportional Integral Derivative Controller (PID), a hardware-accelerated logic controller (e.g. for encoding, decoding, transcoding, etc.), the like, or a combination thereof. Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller module can also include a data storage component accessible by the processor, including memory, whether transition, volatile or non-transient, or non-volatile memory. Additional non-limiting examples of the memory can include Random Access Memory (RAM), Read-Only Memory (ROM), flash memory, or one or more different types of portable electronic memory, such as discs, DVDs, CD-ROMs, flash drives, Universal Serial Bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to affect a functional or operable outcome, as described herein.

The exemplary drawings are for purposes of illustration only and the dimensions, positions, order and relative sizes reflected in the drawings attached hereto can vary.

FIG. 1 is a schematic illustration of an aircraft 10 and a ground system, specifically an Air Traffic Controller (ATC) 32. The aircraft 10 can include one or more propulsion engines 12 coupled to a fuselage 14. A cockpit 16 can be positioned in the fuselage 14 and wing assemblies 18 can extend outwardly from the fuselage 14. Further, a set of aircraft systems 20 that enable proper operation of the aircraft 10 can be included as well as one or more controllers or computers 22, and a communication system having a communication link 24. While a commercial aircraft has been illustrated, it is contemplated the aircraft 10 can be any type of aircraft, for example, without limitation, fixed-wing, rotating-wing, personal aircraft, and the like.

The set of aircraft systems 20 can reside within the cockpit 16, within the electronics and equipment bay (not shown), or in other locations throughout the aircraft 10 including that they can be associated with the propulsion engines 12. Such aircraft systems 20 can include but are not limited to an electrical system, an oxygen system, hydraulics or pneumatics system, a fuel system, a propulsion system, flight controls, audio/video systems, an Integrated Vehicle Health Management (IVHM) system, and systems associated with the mechanical structure of the aircraft 10.

The computer 22, can be operably coupled to the set of aircraft systems 20. The computer 22 can aid in operating the set of aircraft systems 20 and can receive information from the set of aircraft systems 20 and the communication link 24. The computer 22 can, among other things, automate the tasks of piloting and tracking the flight plan of the aircraft 10. The computer 22 can also be connected with other controllers or computers of the aircraft 10 such as, but not limited to, an avionics device, specifically a Flight Management System (FMS) 8.

Any number aircraft systems 20, such as sensors or the like, can be communicatively or operably coupled to the computer 22. The sensors can provide or receive information to or from the computer 22 based on the operation of the aircraft 10.

A communication link 24 can be communicably coupled to the computer 22 or other processors of the aircraft to transfer information to and from the aircraft 10. It is contemplated that the communication link 24 can be a wireless communication link and can be any variety of communication mechanisms capable of wirelessly linking with other systems and devices and can include, but are not limited to, satellite uplink, SATCOM internet, VHF Data Link (VDL), Aircraft Communications Addressing and Reporting System (ACARS network), Aeronautical Telecommunication Network (ATN), Automatic Dependent Surveillance-Broadcast (ADS-B), Wireless Fidelity (WiFi), WiMax, 3G wireless signal, Code Division Multiple Access (CDMA) wireless signal, Global System for Mobile Communication (GSM), 4G wireless signal, 5G wireless signal, Long Term Evolution (LTE) signal, focused energy (e.g., focused microwave, infrared, visible, or ultraviolet energy), or any combinations thereof. It will also be understood that the particular type or mode of wireless communication is not critical, and later-developed wireless networks are certainly contemplated. Further, the communication link 24 can be communicably coupled with the computer 22 through a wired link. Although only one communication link 24 has been illustrated, it is contemplated that the aircraft 10 can have multiple communication links communicably coupled with the computer 22. Such multiple communication links can provide the aircraft 10 with the ability to transfer information to or from the aircraft 10 in a variety of ways.

As illustrated, the computer 22 can communicate with an external source. Specifically, the computer 22 can communicate with the ATC 32 via the communication link 24. The ATC 32 can be a ground facility which can communicate directly with the FMS 8 or any other avionics device communicatively coupled to the aircraft 10. The ATC 32 can be any type of ATC 32 such as one operated by an Air Navigation Service Provider (ANSP). The computer 22 can request and receive information from the designated ATC 32 or the designated ATC 32 can send a transmission to the aircraft 10. Although illustrated as the ATC 32, it will be appreciated that the aircraft 10 can communicate with any suitable external source such as, but not limited to, an Air Operations Center (AOC), or the like.

Figure 2:
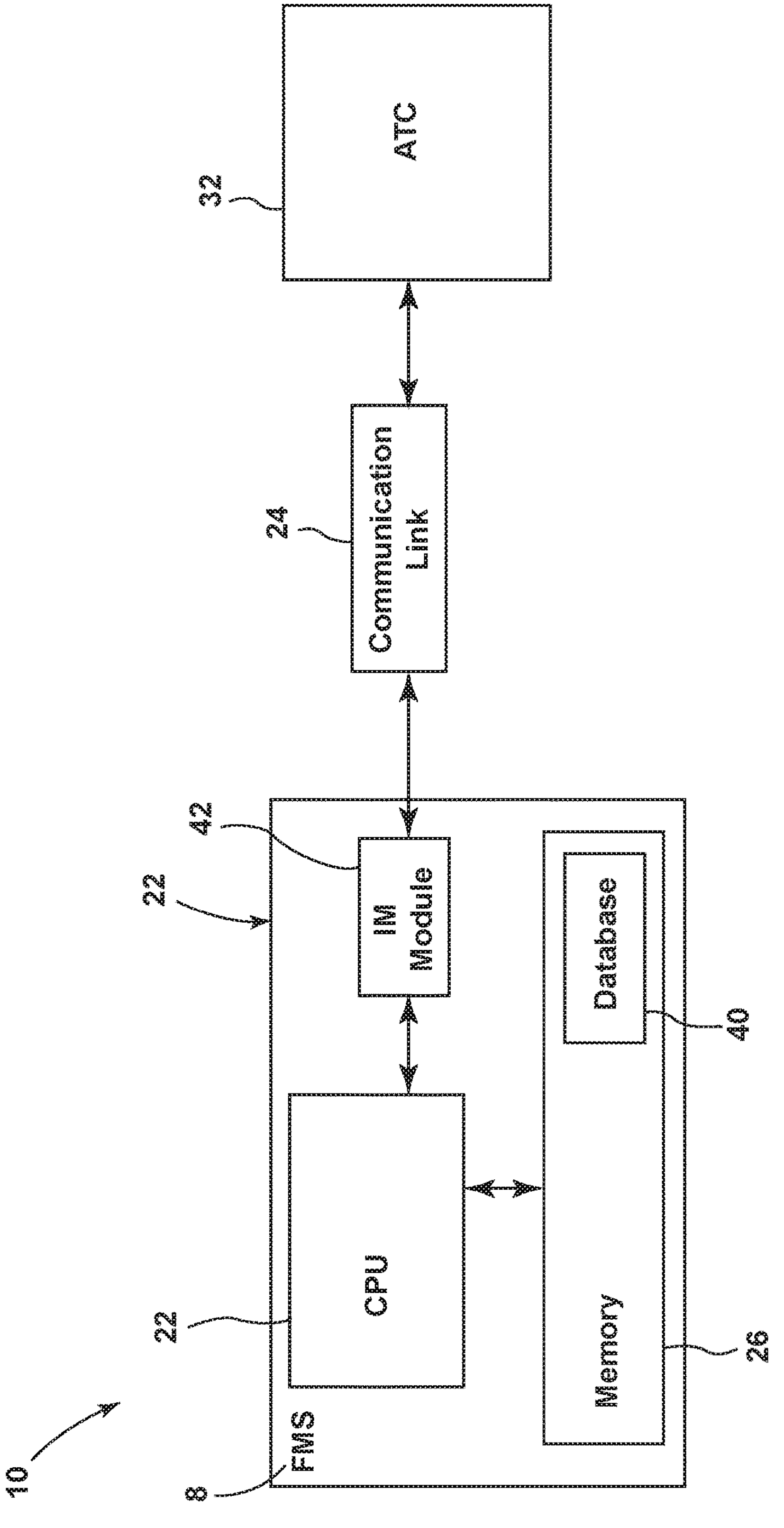
FIG. 2 is a block diagram of an avionics device that can be utilized with the aircraft and ground system of FIG. 1, according to aspects described herein.

As a non-limiting example, FIG. 2 illustrates the computer 22 which can form a portion of the FMS 8 or the FMS 8 can form a portion of the computer 22. The FMS 8 can further be communicatively coupled to the ATC 32 via the communication link 24. Although illustrated as the FMS 8 and the ATC 32, it will be appreciated that the FMS 8 can be any suitable avionics device as described herein and the ATC 32 can be any suitable external device as described herein.

The computer 22 can further include a memory 26. The memory 26 can be RAM, ROM, flash memory, or one or more different types of portable electronic memory, such as discs, DVDs, CD-ROMs, etc., or any suitable combination of these types of memory.

In the illustrated example, a database component 40 is can be included in the memory 26. It will be understood that the database component 40 can be any suitable database, including a single database having multiple sets of data, multiple discrete databases linked together, or even a simple table of data. It is contemplated that the database component 40 can incorporate a number of databases or that the database can actually be a number of separate databases. The database component 40 can be a Navigation Database (NDB) containing information including, but not limited to, airports, runways, airways, waypoints, terminal areas, navigational aids, airline/company-specific routes, and procedures such as Standard Instrument Departure (SID), and Standard Terminal Approach Routes (STAR). The database component 40 can alternatively include the memory 26 in the FMS 8 containing a flight plan.

The computer 22 can include one or more processors, which can be running any suitable programs. The computer 22 can include various components (not shown) as described herein. The computer 22 can include or be associated with any suitable number of individual microprocessors, power supplies, storage devices, interface cards, auto flight systems, flight management computers, and other standard components. The computer 22 can further include or cooperate with any number of software programs (e.g., flight management programs) or instructions designed to carry out the various methods, process tasks, calculations, and control/display functions necessary for operation of the aircraft 10. By way of non-limiting example, a navigation system including a GNSS receiver configured to provide data that is typical of GPS systems, such as the coordinates of the aircraft 10 can be coupled with the computer 22. Position estimates provided by the GNSS receiver can be replaced or augmented to enhance accuracy and stability by inputs from other sensors, such as inertial systems, camera and optical sensors, and Radio Frequency (RF) systems (none of which are shown for the sake of clarity). Such navigational data may be utilized by the FMS 8 for various functions, such as to navigate to a target position.

While not illustrated it will be understood that any number of sensors or other systems can also be communicatively or operably coupled to the computer 22 to provide information thereto or receive information therefrom. By way of non-limiting example, a navigation system including the GNSS receiver configured to provide data that is typical of GPS systems, such as the coordinates of the aircraft 10 can be coupled with the computer 22 or the IM module 42. Position estimates provided by the GNSS receiver can be replaced or augmented to enhance accuracy and stability by inputs from other sensors, such as inertial systems, camera and optical sensors, and Radio Frequency (RF) systems (none of which are shown for the sake of clarity). Such navigation data may be utilized by the IM module 42 and the FMS 8 for various functions, such as to navigate to a target position.

The flight plan and other flight procedure information can be supplied to the aircraft 10 via the communication link 24 from the ATC 32 or any other suitable external source. Additionally, or alternatively, the flight plan can be supplied to the avionics device via an Electronic Flight Bag (EFB). The EFB (not shown) can be communicatively coupled to the ATC 32 and the communication link 24 such that an original flight plan, or any updates to at least a portion of the flight plan, can be received by or contained within the EFB. The EFB can then subsequently upload the flight plan or any updates to the flight plan to the FMS 8 via the communication link. The EFB can include a controller module which can be configured to automatically perform the calculations, determinations, executions, and transmissions of the FMS 8. The controller module can be configured to run any suitable programs or executable instructions designed to carry out various methods, functionality, processing tasks, calculations, or the like, to enable or achieve the technical operations or operations described herein. As such, it will be understood that the various operations described herein of updating the flight plan can be done through or via the avionics device, specifically the FMS 8. As used herein, the phrase "via the avionics device" can be defined as processing or other suitable operations done within the avionics device through the components of the avionics device, or the phrase can alternatively refer to the processing and other suitable operations done external the avionics device in which the avionics device delegated or solicited the external device to perform these operations. The external device can include, for example, the EFB.

Figure 3:
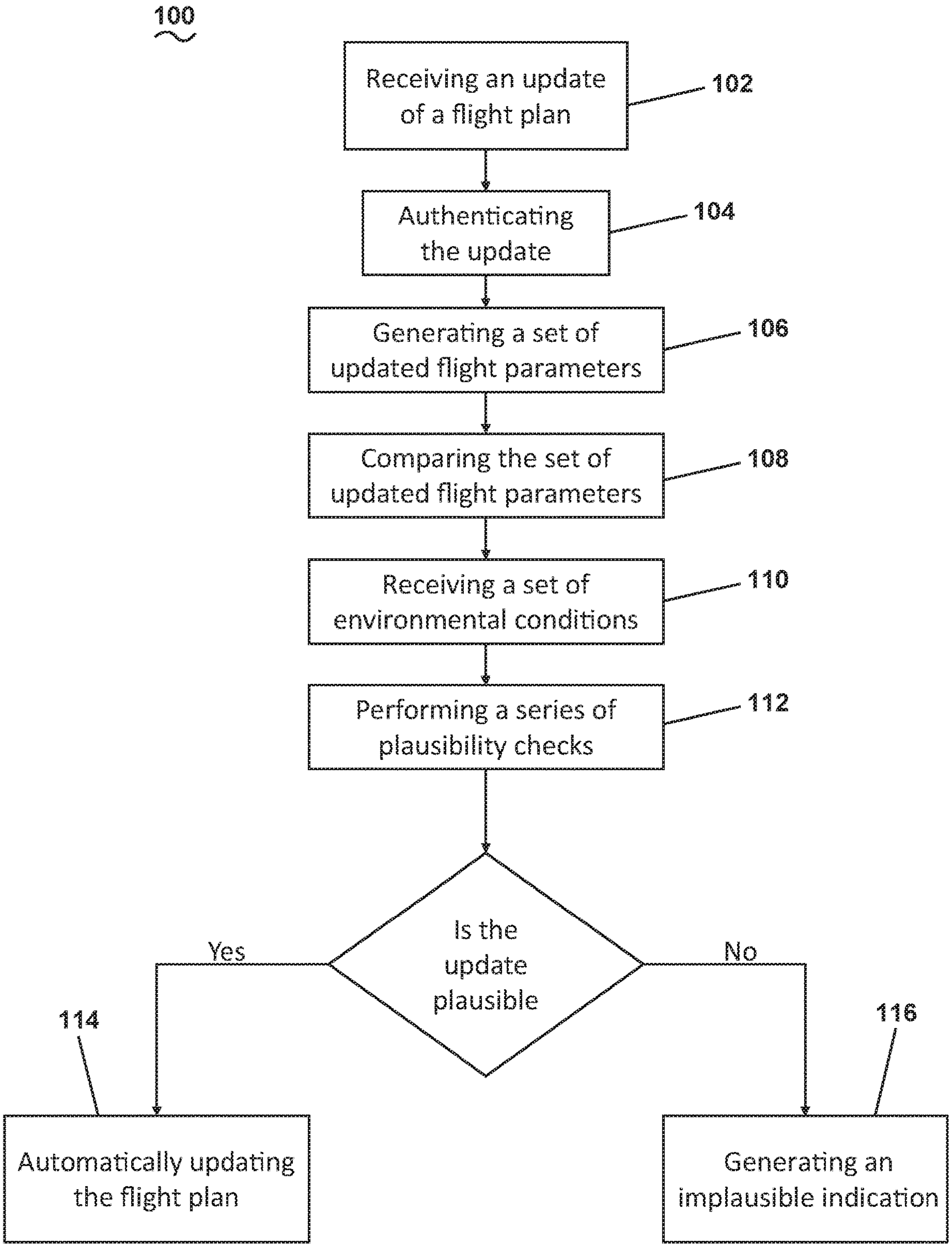
FIG. 3 is a flow chart diagram illustrating a method of updating a flight plan through the avionics device of FIG. 2 including a series of plausibility checks, according to aspects described herein.

FIG. 3 illustrates a non-limiting example method 100 of updating the flight plan received from the ATC 32 via the FMS 8 of FIG. 2. Although described in terms of the FMS 8 and the ATC 32, it will be appreciated that the method 100 can be applied to any suitable avionics device configured to communicate with any suitable external device.

The method 100 can begin with the FMS 8 receiving an update to at least a portion of the flight plan from the ATC 32, at 102. The update to the flight plan can include any one or more of, but is not limited to, an update to a flight path, an update to a flight time, an update to traffic conditions, an update to airport condition, or a combination thereof. Additionally, the update to at least a portion of the flight plan can be a Time-Based Flow Management (TBFM) for the destination airport. The TBFM update can be based off of one or more approach requirements for a destination airport such as, but not limited to, a local traffic pattern of the airport, the time of arrival, weather, ground conditions, or a combination thereof. The TBFM update, or otherwise the update to at least a portion of the flight plan can further include a change of runway at the airport, a change to the time of arrival, or the like. It is contemplated that the update to the flight path can further include a change of the altitude the aircraft 10 is flying at or a change in one or more waypoints along the flight path. The update of at least a portion of the flight plan can then be authenticated or validated, via the FMS 8, to define a valid update, at 104. This can be done automatically by the FMS 8. As used herein, the valid update can be defined as the update to at least a portion of the flight plan which was validated or authenticated, via the FMS 8. The validation or authentication of the flight plan can include verifying the source of the update to at least a portion of the flight plan. For example, it is contemplated that the update to at least a portion of the flight plan can contain at least an identifying header that allows the FMS 8 to know where the update to at least a portion of the flight plan was sent from. As such the source of the update to at least a portion of the flight plan can be validated by confirming, via the FMS 8, that the update to at least a portion of the flight plan was received from a trusted or verified source. As used herein, the phrase "trusted source" or "verified source" can refer to an external source which is pre-authorized or otherwise authorized, via the FMS 8, to transmit or send updates to at least a portion of the flight plan directly to a portion of the aircraft 10. Further, the validating and authenticating of the flight plan can include verifying that the data contained within the update to the flight plan has a reasonable or correct range or field. In other words, the validating can comprise determining a correctness of data fields and ranges of the update to at least a portion the flight plan. For example, if the update to at least a portion of the flight plan contains an update to the location of the destination airport including at least a latitude, longitude and elevation, the values of the update to the location of the airport can be validated or authenticated, via the FMS 8, to ensure an updated location of the airport makes sense when compared a pervious known location of the airport. For example, if the update to at least a portion of the flight plan includes an elevation of the destination airport which is a 100% greater than the previously known elevation, the data field and ranges of the update can be flagged, via the FMS 8, as not being correct as it does not make sense for an airport to gain such a large elevation change.

With the valid update that was determined, at 104, a set of updated flight parameters can be generated, via the FMS 8, at 106. The set of updated flight parameters can include, but are not limited to, a fuel usage, a flight time, or a combination thereof. The set of updated flight parameters can then be compared against a set of known, or current flight parameters, via the FMS 8, at 108. The comparing can be done to determine a difference in at least one updated flight parameter of the set of updated flight parameters and a corresponding current flight parameter of the set of current flight parameters. For example, the set of updated flight parameters can contain an updated fuel usage that, via the FMS 8, can be compared to a current fuel usage included within the set of current flight parameters. The FMS 8 can further receive at least a set of environmental conditions from the ATC 32, at 110. The set of environmental conditions can include one or more of, but are not limited to, an air-traffic pattern, a weather pattern, or a combination thereof. The set of environmental conditions received, via the FMS 8, can be defined as a set of received environmental conditions.

A series of plausibility checks can be performed, via the FMS 8, at 112. The series of plausibility checks can be performed on the values obtained from the comparing of the updated flight parameters with the current flight parameters, at 108. The series of plausibility checks can determine the plausibility of the difference between the updated and current flight parameters. For example, the series of plausibility checks can determine if the comparison between the updated fuel usage and the current fuel usage is plausible. If the comparison does not place the fuel reserves of the aircraft 10 under the minimum requirement or mandatory reserves, then the flight plan would be plausible. It is contemplated that the series of plausibility checks can be performed by various avionics devices external to the FMS 8. For example, the series of plausibility checks can be performed by the EFB.

At 114, if the update to at least a portion of the flight plan is determined to be plausible, then the flight plan can be automatically updated according to the update received, at 102. As used herein, the term “automatically” can be defined by a process done without the need for interaction or direct input from a user of the aircraft 10. For example, the flight plan can be updated automatically, via the FMS 8, without interaction from a user of the aircraft 10. As such, the aircraft 10 can then be operated according to an updated flight plan.

On the other hand, if the plausibility check finds that the update to at least a portion of the flight plan would be implausible, an indication, defined as an implausible indication, can be generated, at 116. For example, if the series of plausibility checks determine that that the updated fuel usage would put the aircraft 10 under the minimum or mandatory requirements for a fuel reserve, then the plausibility check would determine that the updated flight plan is not plausible. In such a case where the updated flight plan is not plausible, the implausible indication is generated. The implausible indication could be any one or more of an indication sent to a display within a cockpit that is visible to one or more of the flight crew or the pilot indicating that the update to the flight plan is not plausible. For example, the implausible indication could be sent to a user interface of the EFB or the computer 22.

Figure 4:
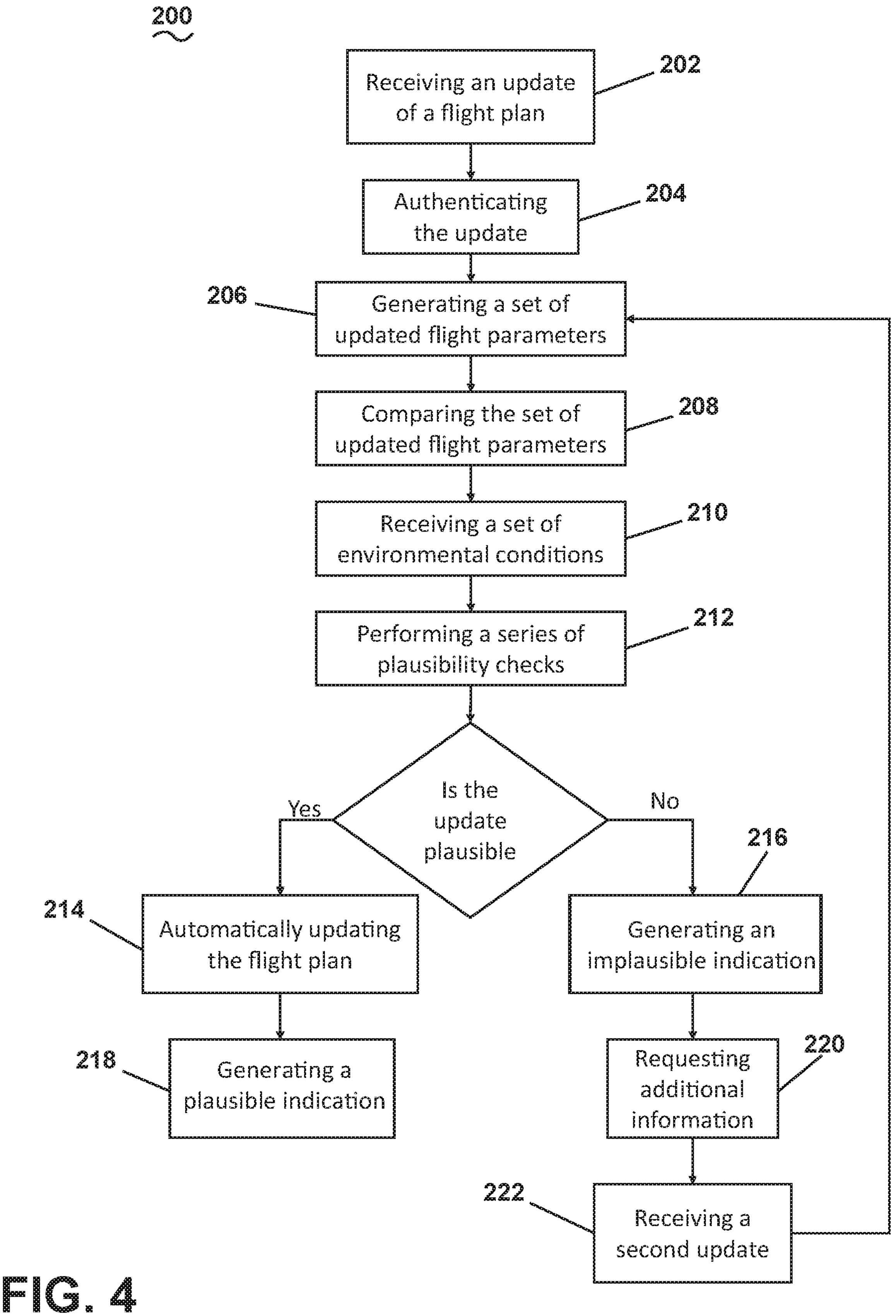
FIG. 4 is an exemplary flow chart diagram illustrating a method of updating a flight plan through the avionics device of FIG. 2 including a first and a second update, according to aspects described herein.

FIG. 4 illustrates a non-limiting example method 200 of updating at least a portion of the flight plan received from the ATC 32 via the FMS 8 of FIG. 2. Although described in terms of the FMS 8 and the ATC 32, it will be appreciated that the method 200 can be applied to any suitable avionics device configured to communicate with any suitable external device.

The method 200 can begin with the FMS 8 receiving the update to at least a portion of the flight plan from the ATC 32, at 202. The update to at least a portion of the flight plan can then be authenticated or validated, via the FMS 8, to define the valid update, at 204. The validation or authentication of the flight plan can include verifying the source of the update to the flight plan. With the valid update, the set of updated flight parameters can be generated, via the FMS 8, at 206. The set of updated flight parameters can then be compared against the set of known, or current flight parameters, via the FMS 8, at 208. The FMS 8 can further receive at least the set of environmental conditions from the ATC 32, at 210. The series of plausibility checks can then be performed, via the FMS 8, at 212.

If the update to at least a portion of the flight plan is determined to be plausible, then the flight plan can be automatically updated according to the update to at least a portion of the flight plan, via the FMS 8, at 214. As such, the aircraft 10 can then be operated according to the updated flight plan. An indication, defined as a plausible indication, can further be generated, via the FMS 8, in order to indicate to one or more of the flight crew, the pilot, or the ATC 32 of the updated flight plan, at 218. The plausible indication can provide an expression that the update to at least a portion of the flight plan was plausible and the flight plan has been updated. The plausible indication can be provided on one or more of a user interface of the FMS 8, the EFB, the computer 22, the ATC 32, or any other suitable device. It is contemplated that the plausible indication can further include a detailed message containing at least a portion of the updates made to the flight plan. For example, the plausible indication can include one or more of an updated flight time, an updated destination time, an updated flight usage, or any combination thereof.

If the update to at least a portion of the flight plan is determined to be implausible, then the implausible indication can be generated, via the FMS 8, at 216. The implausible indication can contain a reason for why the update to at least a portion of flight plan was implausible. It is contemplated the implausible indication can include a detailed message containing at least a portion of the updates to the flight plan which were deemed to be implausible.

A request can then be generated, via the FMS 8, for additional information via a second update, at 220. The additional information can be any one or more of an updated set of flight parameters or environmental conditions. Specifically, the additional information can be any set of corrected or updated flight parameters or corrected or updated environmental conditions such as, but not limited to, a corrected or updated fuel level, a corrected or updated weather pattern, a corrected or updated traffic pattern, a corrected or updated wind speed, or any combination thereof. Additionally, or alternatively, the additional information can be requested and received, via the FMS 8, from the external source, specifically the ATC 32, without the need for manual intervention from the flight crew or the pilot. For example, the FMS 8 can request that the ATC 32 send an update to the set of environmental conditions. The ATC 32 can subsequently send the update to the set of environmental condition to the aircraft 10 which can be received via the FMS 8. The additional information can be contained within the second update to the flight plan. It is further contemplated that the flight crew or the pilot can receive and review the implausible indication and determine what needs to be changed to ensure the update to at least a portion of the flight plan is plausible. As such, the second update can be received, via the FMS 8, at 222. At least a portion of the method 200, specifically 206 through 212, can then be performed again with the second update to at least a portion of the flight plan taking place or otherwise being combined with the update to at least a portion of the flight plan received, at 202. If the second update to the flight plan is determined to be plausible, the flight plan can be automatically updated according to the second update, via the FMS 8, at 214. Alternatively, if the second update is found to be once again implausible, an implausible indication can be generated, via the FMS 8, at 216. The implausible indication can contain information which indicates to one or more of the flight crew or the pilot the portions of the updated flight plan which are deemed to be an issue. For example, the updated flight plan can contain an implausible flight time or fuel usage. As a result, the implausible indication can highlight these issues with the flight plan for review from the flight crew or the pilot. As such, the flight crew, the pilot, the ATC 32, the EFB, or any other suitable external device can supply any number of additional updates to at least a portion of the flight plan until the updated flight plan is plausible, and the flight plan can be automatically updated. It will be further appreciated that the second update, or any other subsequent update, can be an automatic update from the external source. For example, the second update could be an update to the set of environmental conditions. The pilot of the flight crew would not know changes to weather patterns without having first received an update from the external source. As such, if changes in the environmental conditions have occurred and they are relevant to the flight plan or the updated flight plan of the aircraft 10, then the external source can automatically supply subsequent or continuous updates to the aircraft 10 with the most up-to-date environmental conditions.

The sequences depicted are for illustrative purposes only and is not meant to limit the method 100, 200 in any way as it is understood that the portions of the method can proceed in a different logical order, additional or intervening portions can be included, or described portions of the method can be divided into multiple portions, or described portions of the method can be omitted without detracting from the described method. For example, the method 100, 200 can include various other intervening steps. The examples provided herein are meant to be non-limiting.

In one non-limiting example, the series of plausibility checks can include at least a first of the series of plausibility checks and a second of the series of plausibility checks. The first of the series plausibility checks can find the plausibility of the updated flight parameters which were generated at 106, 206 and subsequently compared with the current set of flight parameters at 108, 208. The second of the series of plausibility checks can find the plausibility of the updated flight parameters or the update to at least a portion of the flight plan based on the set of environmental conditions received at 110, 210. For example, the first of the series of plausibility checks can either find that the update to at least a portion of the flight plan results in a reduction of (or no change in) the fuel usage, or an increase in the fuel usage. In the case where there is no change in or a reduction in the fuel usage, the second of the series of plausibility checks can be omitted and the flight plan can be automatically updated at 114, 214. In the case where the fuel usage increases, the second of the series of plausibility checks can be performed and the updated flight plan can be compared against the set of environmental conditions. For example, if it is found that the update to at least a portion of the flight plan would increase the fuel usage and divert the aircraft 10 into unfavorable weather conditions such as, for example, a storm, the implausible indication can be generated, at 116, 216, to inform the pilot, the flight crew, any suitable external source, or any combination thereof that the update to at least a portion of the flight plan is implausible. It is further contemplated, however, that in either case outlined prior, the second of the series of plausibility checks can still be performed. For example, if it is determined that the fuel usage is decreased or remains the same, the updated flight plan can still be compared against the set of environmental conditions. If it is determined that the update to the flight plan would divert the aircraft through unfavorable weather conditions, the implausible indication can be generated, at 116, 216. It is further contemplated that the above-example is meant to be non-limiting and that there can be any number of one or more of the series of plausibility checks which can find or otherwise determine the plausibility of the update to at least a portion of the flight plan based on any updated flight parameter or any environmental condition.

In another non-limiting example, determining, via the avionics device, the plausibility of the flight plan utilizing the valid update generated, at 104, 204, can be performed. The determining of the plausibility of the flight plan with the valid update can further include verifying a set of identifying information, via the avionics device. The identifying information can be any information identifying the avionics device, the aircraft 10, any other aircraft or the external source. Specifically, the identifying information can include, but is not limited to, a flight number, a destination, a time, a reason for receiving the update to at least a portion of the flight plan, or any combination thereof. It is contemplated that the determining of the plausibility of the flight plan can be included within the series of plausibility checks performed, at 112, 212. It is yet further contemplated that the set of identifying information can be provided to the flight crew, the pilot, any suitable external source, or any combination thereof as part of one or more of the plausible or implausible indications generated, at 114, 214 and 116, 216, respectively.

In another non-limiting example, verifying, via the avionics device, that the update to at least a portion of the flight plan that was received, at 102, 202, was received from an authorized entity. As used herein, the term authorized entity can refer to any entity defined as an external source which was pre-authorized to transmit or send updates to at least a portion of the flight plan to the aircraft 10. A list of authorized entities can be stored within a memory accessible via the avionics device such as, but not limited to, the memory 26 of the FMS 8, an internal memory of the EFB, or any combination thereof. Specifically, the list of authorized entities can be sorted within the database 40 of the FMS 8. It is contemplated that verifying that the update to at least a portion of the flight plan was received from the authorized entity can occur in tandem with authenticating the update to at least a portion of the flight plan, at 104, 204. It is even further contemplated that one or more of the verifying of the authorized entity, the authenticating of the update to at least a portion of the flight plan, or the determining of the correctness of the data fields or ranges can be done through a cryptographic authentication. As used herein, the term "cryptographic authentication" can be defined as authentication through establishment or identification of a key or password. The key can be any alphanumeric combination, or solely include numbers, symbols, or letters. The cryptographic authentication can allow for the external source to be easily identified as the key, or a transmission containing the key, can be received, via the avionics device, which can then compare the key with a known set of trusted or otherwise authenticated keys. If the key is determined to be known, trusted, or otherwise authenticated, the update to at least a portion of the flight plan can be determined to be from an authorized entity. If, however, the key does not match any known, trusted, or otherwise authorized keys, then the update to at least a portion of the flight plan can be rejected. It is further contemplated that if the key does not match any known, trusted, or otherwise authorized keys, then one or more the pilot or the flight crew can manually review the key to determine if it should be trusted. Additionally, or alternatively, the external source can be blocked, via the avionics device, from sending further updates if the key is determined to be from an unauthorized source. It is further contemplated that the external device can be a pre-authorized device (i.e., the EFB) that is paired with the avionics device (i.e., the FMS). As used herein, the term "pair", "pairing", or iterations thereof, can be defined as the establishment of a secured connection between the avionics device and the external source. As such, the update to at least a portion of the flight plan does not need to be verified as the external source and the avionics device are already paired. It is further contemplated, however, that in instances where the external source and avionics device are not paired that the update to at least a portion of the flight plan can contain the key. For example, if the update to at least a portion of the flight plan were received, via the avionics device, from an external source which is not already authenticated (i.e., via ATC, AOC, ACARS, or the like), the update to at least a portion of the flight plan can contain the key. As such, the external source can be indirectly verified, via the avionics device, by comparing the key within the update to at least a portion of the flight plan with the set of known, trusted, or otherwise authenticated keys.

In another non-limiting example, the plausible indication generated, at 218, or the implausible indication generated, at 216, can each include a summary of the relevant information to the plausibility or implausibility, respectively, of the update to at least a portion of the flight plan. Specifically, in the case of the plausible indication, the summary can include at least one update made to the flight plan. On the other hand, in the case of the implausible indication, the summary can include the one or more sections of the update to the flight plan which were determined to be implausible. Additionally, or alternatively, the method 100, 200 can include generating, via the avionics device, one or more summaries to be included in the plausible indication or the implausible indication. For example, once the plausibility of the update is determined, the FMS 8, or any other suitable avionics device (e.g., the EFB), can automatically perform a review analysis of the plausibility or implausibility of the update to at least a portion of the flight plan. Certain sections of the update to at least a portion of the flight plan can be highlighted or otherwise flagged, via the avionics device. These sections which are flagged, via the avionics device, can include, for example, one or more portions of the updated or current flight parameters, the comparison between the updated and current flight parameters or environmental conditions, the environmental conditions, the series of plausibility checks, the update to the flight plan itself, or any combination thereof. The review analysis can identify, via the avionics device, major differences between the updated sections of the flight plan and the original or current flight plan. For example, if the update to at least a portion of the flight plan would divert the aircraft through a storm whereas the original or current flight plan would not run through the storm, the review analysis can flag this change. Other comparisons or major changes can be, but are not limited to, the fuel usage, the flight time, the altitude, the destination runway, the destination airport, or any combination thereof. In the case of an implausible update, the review analysis can determine the reasons for why the update to at least a portion of the flight plan was determined to be implausible and highlight or otherwise flag these sections. The highlighted or otherwise flagged sections can then be compiled into the summary and sent to one or more of the flight crew, the pilot, any suitable external source, or any combination thereof through the implausible or plausible indications. The flight crew, the pilot, any suitable external source, or any combination thereof can then review the summary in order to easily identify the changes which were made in the case of the plausible indication, or the reasons for why the update is implausible.

It is contemplated that aspects of this disclosure can be advantageous for use over conventional systems or methods for updating the flight plan of the aircraft. Specifically, advantages can include more frequent or constant updates to the flight plan of an aircraft and also allows for the flight crew or the pilot for more freedom of time when compared to conventional updating methods (e.g., the flight crew or the pilot is not to be bogged down with updating the flight plan manually). For example, conventional updating methods can require that the pilot or the flight crew manually perform the updating of the flight plan. Specifically, conventional updating methods can require the pilot or the flight crew manually accept the update to the flight plan, manually authenticate the flight plan, and then manually update the flight plan. This can be very time consuming and take the flight crew or the pilot away from other tasks that need to be performed to operate the aircraft. Due to the time demand it takes to update the flight plan with conventional updating methods, the time between updates to the flight plan can be larger to ensure the pilot and the flight crew are not bogged down by having to constantly manually update the flight plan. The method disclosed herein, however, does not require intensive manual interactions from the flight crew or the pilot, in fact, the methods described herein can in some instances not require any interaction from the flight crew or the pilot at all. The methods described herein can receive, verify, authenticate, and update the flight plan automatically according to an update to at least a portion of the flight plan received from an external source. All of this can be done without any intervention from the flight crew or the pilot. This, in turn, frees up time with the pilot or the flight crew. Additionally, as less interaction is needed from the flight crew or the pilot, that means more updates can be received, via the avionics device, at a higher frequency. As such, the update to the flight plan can be continuously or more frequently updated to ensure the current flight plan which the aircraft is operating on is the most up to date flight plan available. It is contemplated that the methods described herein that a workload of the pilot or the flight crew can be reduced so much when compared to conventional updating methods, that the aircraft can be operated with a reduced number of people. In some instances, the aircraft utilizing the method described herein can be defined as an aircraft with a single person operation.

To the extent not already described, the different features and structures of the various embodiments can be used in combination with each other as desired. That one feature is not illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Various characteristics, aspects and advantages of the present disclosure may also be embodied in any permutation of aspects of the disclosure, including but not limited to the following technical solutions as defined in the enumerated aspects:

A method for updating a flight plan, comprising receiving, via an avionics device, an update to at least a portion of a flight plan from an external source, at least one of authenticating or validating, via the avionics device, the update to define a valid update, generating with the valid update, via the avionics device, a set of updated flight parameters comprising, at least one of a fuel usage or a flight time, comparing, via the avionics device, the set of updated flight parameters with a set of current flight parameters to determine a difference in at least one of fuel usage or flight time, receiving, via the avionics device, a set of environmental conditions comprising, at least one of a weather pattern or an air-traffic pattern to define a set of received environmental conditions, performing, via the avionics device, a series of plausibility checks based of the comparing, and in response to the series of plausibility checks, automatically updating the at least the portion of the flight plan if plausible or generating an implausible indication if there is an implausible condition.

The method of any preceding clause wherein a first of the series of plausibility checks finds the at least the portion of the flight plan plausible if the fuel usage is reduced.

The method of any preceding clause wherein when a first of the series of plausibility checks finds an increase in fuel usage, a second of the series of plausibility checks is automatically performed.

The method of any preceding clause wherein the second of the series of plausibility checks finds the at least the portion of the flight plan plausible if comparing indicates weather or traffic changes.

The method of any preceding clause wherein the series of plausibility checks further comprises determining fuel usage meets mandatory reserves.

The method of any preceding clause wherein the authenticating comprises verifying, via the avionics device, the flight plan was received from an authorized entity.

The method of any preceding clause wherein the validating comprises determining a correctness of data fields and ranges of the at least a portion of the flight plan.

The method of any preceding clause, further comprising determining with the valid update, within the avionics device, a plausibility of the flight plan.

The method of any preceding clause wherein determining the plausibility of the updated flight plan includes verifying, at least, a flight number, a destination, a time, or a reason for receiving the updated flight plan.

The method of any preceding clause further comprising providing to a flight crew or a pilot an plausible indication upon automatically updating the at least the portion of the flight plan if plausible.

The method of any preceding clause wherein the plausible indication includes at least a message including at least an updated destination time.

The method of any preceding clause further comprising requesting, via the avionics device, additional information from at least one of a flight crew or a pilot.

The method of any preceding clause, wherein the additional information is a set of corrected flight parameters.

The method of any preceding clause, wherein requesting of additional information includes sending a message identifying at least one issue with the at least the portion of the flight plan.

The method of any preceding clause further comprising receiving, via the avionics device, a second update containing at least the additional information from at least one of the flight crew or the pilot.

The method of any preceding clause further comprising repeating, via the avionics device, at least some of the series of plausibility checks.

The method of any preceding clause, wherein repeating at least some of the series of plausibility checks includes comparing the additional information with the set of current flight parameters or the set of updated flight parameters.

The method of any preceding clause further comprising automatically updating, via the avionics device, the at least the portion of the flight plan based off of the second update if plausible or generating an additional implausible indication if there is an implausible condition.

A system adapted to verify an updated flight plan, to perform the steps of receiving the updated flight plan, generating a set of updated flight parameters comprising, at least one of a fuel usage or a flight time, comparing the set of updated flight parameters with a set of current flight parameters to determine a difference in at least one of fuel usage or flight time, generating a set of environmental conditions comprising, at least one of a weather pattern or an air-traffic pattern to define a set of received environmental conditions, performing a series of plausibility checks based of the comparing, and in response to the series of plausibility checks, automatically updating at least a portion of the flight plan if plausible or generating an indication if there is an implausible condition.

The system of any preceding clause wherein when a first of the series of plausibility checks finds in increase in fuel usage, a second of the series of plausibility checks is automatically performed, wherein the second of the series of plausibility checks finds the at least the portion of the flight plan plausible if comparing indicates weather or traffic changes.

What is claimed is:

1. A method for updating a flight plan of an aircraft having a flight management system and an electronic flight bag provided onboard the aircraft, the method comprising:

receiving, at the electronic flight bag, an update to at least a portion of a flight plan from a source external to the aircraft, receiving, at the flight management system, the update from the electronic flight bag;

at least one of authenticating or validating, via the flight management system, the update to define a valid update;

generating with the valid update, via the flight management system, a set of updated flight parameters comprising, at least one of a fuel usage or a flight time;

comparing, via the flight management system, the set of updated flight parameters with a set of current flight parameters to determine a difference in at least one of fuel usage or flight time;

receiving, via the flight management system, a set of environmental conditions comprising, at least one of a weather pattern or an air-traffic pattern to define a set of received environmental conditions;

performing, via the flight management system, a series of plausibility checks based of the comparing;

in response to the series of plausibility checks, automatically updating the at least the portion of the flight plan if plausible or generating an implausible indication if there is an implausible condition; and operating the aircraft according to the updated flight plan.

2. The method of claim 1 wherein a first of the series of plausibility checks finds the at least the portion of the flight plan plausible if the fuel usage is reduced.

3. The method of claim 1 wherein when a first of the series of plausibility checks finds an increase in fuel usage, a second of the series of plausibility checks is automatically performed.

4. The method of claim 3 wherein the second of the series of plausibility checks finds the at least the portion of the flight plan plausible if comparing indicates weather or traffic changes.

5. The method of claim 1 wherein the series of plausibility checks further comprises determining fuel usage meets mandatory reserves.

6. The method of claim 1 wherein the authenticating comprises verifying, via the flight management system, the flight plan was received from an authorized entity.

7. The method of claim 1 wherein the validating comprises determining a correctness of data fields and ranges of the at least a portion of the flight plan.

8. The method of claim 1 further comprising providing to a flight crew or a pilot a plausible indication upon automatically updating the at least the portion of the flight plan if plausible.

9. The method of claim 8 wherein the plausible indication includes at least a message including at least an updated destination time.

10. The method of claim 1 further comprising requesting, via the flight management system, additional information from at least one of a flight crew or a pilot.

11. The method of claim 10, wherein requesting of additional information includes sending a message identifying at least one issue with the at least the portion of the flight plan.

12. The method of claim 10 further comprising receiving, via the flight management system, a second update containing at least the additional information from at least one of the flight crew or the pilot.

13. The method of claim 12 further comprising repeating, via the flight management system, at least some of the series of plausibility checks.

14. The method of claim 13, wherein repeating at least some of the series of plausibility checks includes comparing the additional information with the set of current flight parameters or the set of updated flight parameters.

15. The method of claim 14 further comprising automatically updating, via flight management system, the at least the portion of the flight plan based off of the second update if plausible or generating an additional implausible indication if there is an implausible condition.

16. A system provided onboard an aircraft, the system adapted to verify an updated flight plan of the aircraft, the system including at least a flight management system and an avionics device external the flight management system, the flight management system and the device external to the flight management system both being provided on the aircraft, the system adapted to perform the steps of:

receiving, at the avionics device external to the flight management system, the updated flight plan from a source external to the aircraft, receiving, at the flight management system, the updated flight plan from the avionics device external the flight management system;

generating, via the flight management system, a set of updated flight parameters comprising, at least one of a fuel usage or a flight time;

comparing, via the flight management system, the set of updated flight parameters with a set of current flight parameters to determine a difference in at least one of fuel usage or flight time;

generating, via the flight management system, a set of environmental conditions comprising, at least one of a weather pattern or an air-traffic pattern to define a set of received environmental conditions;

performing, via at least one of either the flight management system or the avionics device external the flight management system, a series of plausibility checks based of the comparing;

in response to the series of plausibility checks, automatically updating at least a portion of the flight plan if plausible or generating an indication if there is an implausible condition; and operating the aircraft according to the updated flight plan.

17. The system of claim 16 wherein when a first of the series of plausibility checks finds in increase in fuel usage, a second of the series of plausibility checks is automatically performed, wherein the second of the series of plausibility checks finds the at least the portion of the flight plan plausible if comparing indicates weather or traffic changes.

18. A method for updating a flight plan of an aircraft having a flight management system provided onboard the aircraft, the method comprising:

receiving, at the flight management system, an update to at least a portion of a flight plan from an avionics device that is external the flight management system, the update having a cryptographic key and at least one updated value to be input to the flight plan;

at least one of automatically authenticating or automatically validating, via the flight management system, the update to define a valid update, wherein:

the automatically authenticating being performed by:

retrieving, via a memory accessible to the flight management system, a valid key related to the avionics device; and comparing, via the flight management system, the cryptographic key with the valid key;

the automatically validating being performed by:

retrieving, via the memory accessible to the flight management system, a set of acceptable values corresponding to the at least one updated value; and determining, via the flight management system, if the at least one updated values is equal to or falls within to the set of acceptable values;

generating with the valid update, via the flight management system, a set of updated flight parameters comprising, at least one of a fuel usage or a flight time;

comparing, via the flight management system, the set of updated flight parameters with a set of current flight parameters to determine a difference in at least one of fuel usage or flight time;

receiving, via the flight management system, a set of environmental conditions comprising, at least one of a weather pattern or an air-traffic pattern to define a set of received environmental conditions;

performing, via at least one of the flight management system or the device external the flight management system, a series of plausibility checks based of the comparing;

in response to the series of plausibility checks, automatically updating the at least the portion of the flight plan if plausible or generating an implausible indication if there is an implausible condition; and operating the aircraft according to the updated flight plan.

19. The method of claim 18, wherein the at least one updated value is at least one of a latitude, longitude or elevation of a destination airport, and the set of known data includes at least one of a set of known latitudes, a set of known longitudes, or a set of known elevations of the destination airport.

20. The method of claim 18, further comprising flagging, via the flight management system, the at least one update as invalid if the at least one updated value does not correspond to or fall within the set of known data.

* * * * *